(12) United States Patent
Nakamura et al.

(10) Patent No.: US 11,202,312 B2
(45) Date of Patent: Dec. 14, 2021

(54) COMMUNICATION APPARATUS

(71) Applicants: SHARP KABUSHIKI KAISHA, Sakai (JP); FG INNOVATION COMPANY LIMITED, Tuen Mun (HK)

(72) Inventors: Osamu Nakamura, Sakai (JP); Atsushi Shirakawa, Sakai (JP); Jungo Goto, Sakai (JP); Yasuhiro Hamaguchi, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 29 days.

(21) Appl. No.: 16/648,990

(22) PCT Filed: Sep. 11, 2018

(86) PCT No.: PCT/JP2018/033611
§ 371 (c)(1),
(2) Date: Mar. 19, 2020

(87) PCT Pub. No.: WO2019/065213
PCT Pub. Date: Apr. 4, 2019

(65) Prior Publication Data
US 2020/0221494 A1    Jul. 9, 2020

(30) Foreign Application Priority Data
Sep. 28, 2017 (JP) .............................. JP2017-187875

(51) Int. Cl.
*H04W 74/00* (2009.01)
*H04L 5/00* (2006.01)

(52) U.S. Cl.
CPC ......... *H04W 74/006* (2013.01); *H04L 5/0007* (2013.01); *H04L 5/0037* (2013.01)

(58) Field of Classification Search
CPC ... H04L 5/0007; H04L 5/0037; H04L 5/0053; H04L 5/0094; H04W 74/006; H04W 74/08; H04W 72/04; H04W 72/12
See application file for complete search history.

(56) References Cited

U.S. PATENT DOCUMENTS

| 2018/0288746 A1* | 10/2018 | Zhang | H04L 1/0031 |
| 2019/0053226 A1* | 2/2019 | Xiong | H04L 5/0091 |
| 2019/0075584 A1* | 3/2019 | Li | H04L 5/0055 |
| 2019/0200334 A1* | 6/2019 | Sasaki | H04L 5/001 |
| 2019/0261354 A1* | 8/2019 | Fakoorian | H04L 1/1812 |
| 2019/0297619 A1* | 9/2019 | Liu | H04W 88/023 |
| 2020/0127778 A1* | 4/2020 | Zhuang | H04L 5/0007 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.5.0 (Mar. 2015).

(Continued)

*Primary Examiner* — Stephen J Clawson
(74) *Attorney, Agent, or Firm* — ScienBiziP, P.C.

(57) ABSTRACT

A base station apparatus controls an access scheme for each radio resource by using higher layer signaling such that only signals generated by a same type of a signal generation method are multiplexed for each radio resource.

4 Claims, 5 Drawing Sheets

(56) References Cited

U.S. PATENT DOCUMENTS

2020/0221429 A1\* 7/2020 Li .................... H04L 5/0053

OTHER PUBLICATIONS

3rd Generation Partnership Project; Technical Specification Group Radio Access Network; Study on Scenarios and Requirements for Next Generation Access Technologies; (Release 14), 3GPP TR 38.913 V0.3.0 (Mar. 2016).
Intel Corporation, "UL grant-free transmissions: Resource configuration", R1-1710568, 3GPP TSGRAN WG1 NR Ad-Hoc#2, Jun. 27-30, 2017.
MCC Support, "Draft Report of 3GPP TSG RAN WG1 #AH_NR3 v0.1.0", 3GPP TSG RAN WG1 Meeting #90bis, 2017.

\* cited by examiner

COMMUNICATION APPARATUS

TECHNICAL FIELD

The present invention relates to a terminal apparatus and a base station apparatus.

This application claims priority to JP 2017-187875 filed on Sep. 28, 2017, the contents of which are incorporated herein by reference.

BACKGROUND ART

In the 3rd Generation Partnership Project (3GPP), a New Radio (NR) has been studied. The NR is a radio access technology of Fifth generation mobile communication systems (5G) subsequent to Forth Generation mobile telecommunication systems (4G) such as Long Term Evolution (LTE), LTE-Advanced, and LTE-Advanced Pro.

Meanwhile, Internet of Things (IoT) and Machine Type Communication (MTC) have become popular in recent years. In terms of natures of such technologies, large-scale terminal communications are estimated to increase that allow a large number of terminal apparatuses (User Equipment: UE) to maintain a state of being connected with a base station apparatus (Base Station: BS, eNB) and simultaneously use an uplink. Therefore, it is important to efficiently implement the uplink communications.

In dynamic scheduling in the radio access technology of 4G, each time a transmission data traffic of a terminal apparatus occurs, a Scheduling Request (SR) is transmitted. After control information (UL Grant) for granting transmission is received from a base station apparatus, data is transmitted in a radio Resource Block (RB) including a combination of predetermined frequency resources and time resources designated by parameters included in the UL Grant. In this manner, the base station apparatus performs radio resource control of all uplink data transmissions (data transmission from the terminal apparatuses to the base station apparatus). Accordingly, although the base station apparatus enables Orthogonal Multiple Access (OMA) by the radio resource control and allows uplink data signal separation by simple reception processing, there is a drawback that an overhead due to the SR occurs in each uplink data transmission.

In 5G, to efficiently implement the large-scale terminal communications such as IoT and MTC, contention-based access has been studied instead of centralized radio resource control, such as dynamic scheduling, that is performed by the base station apparatus. The contention-based access allows each terminal apparatus to autonomously perform uplink transmission without the UL Grant (scheduling information) from the base station apparatus. The contention-based access uses a radio resource block, indicated as Grant Free by Radio Resource Control (RRC) control information, that is to be dedicatedly used for the uplink. In a case that the base station apparatus transmits a grant of the usage to the terminal apparatus, the base station apparatus transmits Activation control information. In a case that the base station apparatus stops the usage, the base station apparatus transmits Deactivation control information. The terminal apparatus may perform or may not perform transmission depending on presence or absence of transmission data during the time the contention-based access is enabled. This reduces the number of control information transmissions. However, in a case that multiple terminal apparatuses perform transmission in the same radio resource, transmission signals collide with each other. In this case, a high-performance equalizer such as an interference canceller allows signal separation although Non-Orthogonal Multiple Access (NOMA) is used. This is effective to a use case in which an amount of data transmitted by the terminal apparatus is small, such as IoT and MTC.

In the 5G NR specification, as a mandatory requirement of an uplink radio transmission (access) scheme to be used, the terminal apparatus is required to use at least both two schemes of Cyclic-Prefix Orthogonal Frequency-Division Multiplexing (CP-OFDM) and Discrete Fourier Transform Spread OFDM (DFT-S-OFDM) (NPL 1, NPL 2). The terminal apparatus determines which radio transmission (access) scheme is to be used, based on control by the base station apparatus.

CITATION LIST

Non Patent Literature

NPL 1: "3rd Generation Partnership Project; Technical Specification Group Radio Access Network; Evolved Universal Terrestrial Radio Access (E-UTRA); Physical layer procedures (Release 12)" 3GPP TS 36.213 v12.5.0 (2015 March)

NPL 2: "3rd Generation Partnership Project; Technical Specification Group Radio Access Network; Study on Scenarios and Requirements for Next Generation Access Technologies; (Release 14)" 3GPP TR 38.913 v0.3.0 (2016 March)

SUMMARY OF INVENTION

Technical Problem

However, in a case that the terminal apparatus autonomously determines which radio transmission scheme is to be used, the following problems arise.

A first problem is that, since a CP-OFDM signal and a DFT-S-OFDM signal coexist in one radio resource block, the signal separation may be difficult. This is because of a difference between transmission outputs of both transmission schemes. The CP-OFDM forms a modulation symbol in the frequency domain. On the other hand, the DFT-S-OFDM forms a modulation symbol in the frequency domain.

In addition, since the CP-OFDM signal forms the modulation symbol in the frequency domain, one of the properties of the CP-OFDM signal is that a Peak to Average Power Ratio (PAPR) in the time domain increases. In a case that high output amplification is performed, due to a non-linear property of amplification of a transmission Power Amplifier (PA), a signal waveform of a high amplitude portion is saturated and distorted. Thus, frequency information cannot be maintained, resulting in a decrease in an error rate during reception. Therefore, an appropriate power amplification factor needs to be applied not to cause the signal waveform to be distorted.

Meanwhile, one of the properties of the DFT-S-OFDM signal is that PAPR decreases under a condition of continuously allocated frequencies, or other conditions. Compared with the CP-OFDM signal, the DFT-S-OFDM signal allows transmission with the amplification factor of the transmission PA increased.

As a second problem, also in a case that only multiple DFT-S-OFDM signals coexist in one radio resource block, in terms of a nature of a modulation signal, the signal separation may be difficult depending on the condition, and the error rate may increase. One of the reasons is a cause due to the continuity of frequencies that each terminal apparatus autonomously selects.

As described above, one of the properties of the DFT-S-OFDM signal is that the PAPR decreases in the case that the frequencies are continuously allocated. Meanwhile, in a case that the frequencies are non-continuously allocated, the PAPR increases.

In other words, even in the case that only the DFT-S-OFDM signals are multiplexed in the same radio resource block, due to an influence of the DFT-S-OFDM signal from the terminal apparatus to which the frequencies are non-continuously allocated, the signal separation may be difficult and the error rate may increase.

One aspect of the present invention has been made in view of the foregoing, and there is provided a technique to implement an uplink data transmission method for providing easier signal separation and a better error rate performance in NOMA in which a large number of terminal apparatuses perform uplink data transmission by using contention-based radio communication technology.

Solution to Problem

To address the above-mentioned drawbacks, a base station apparatus, a terminal apparatus, and a communication method according to an aspect of the present invention are configured as follows.

(1) One aspect of the present invention is a base station apparatus that transmits a control signal to each terminal apparatus in a service cell. The base station apparatus includes a control signal generation unit configured to generate the control signal and a transmission processing unit configured to transmit the control signal. The control signal generation unit generates the control signal that includes information of resource block to be allocated to uplink of each terminal apparatus and information of radio modulation scheme type available in the resource block.

(2) In addition, in one aspect of the present invention, the control signal includes frequency selection information for designating whether to continuously or non-continuously allocate frequencies to be used by the radio modulation scheme type.

(3) In one aspect of the present invention, the information of resource block is either or both of information of resource block for content-based access (NOMA) and information of resource block for non-content-based access (OMA).

(4) In addition, in one aspect of the present invention, in a case that the information of resource block is the content-based access (NOMA), the number of the radio modulation scheme types is limited to one.

(5) One aspect of the present invention is a communication apparatus for communicating with multiple terminal apparatuses by using multiple access schemes, the communication apparatus at least including a controller configured to generate a control signal and a receiver configured to receive a signal from the terminal apparatus. The controller generates a signal to identify a communication slot that allows grant-free communications with the terminal apparatus. Methods of subcarrier allocation to be used in the communication slot identified at least includes a method that uses only a continuous subcarrier allocation and a method that includes a non-continuous subcarrier allocation.

(6) In addition, in one aspect of the present invention, an access scheme used in the communication slot performs an implicit notification to the terminal apparatus.

(7) In addition, in one aspect of the present invention, a method of the implicit notification includes notifying a method of the methods of subcarrier allocation.

(8) In addition, in one aspect of the present invention, a method of the implicit notification includes notifying a spreading code.

(9) In addition, in one aspect of the present invention, the multiple access schemes include DFT-S-OFDM and CP-OFDM.

Advantageous Effects of Invention

According to one or more aspects of the present invention, in the NOMA in which the large number of terminal apparatuses perform uplink data transmission by using contention-based radio communication technology, restricting radio modulation schemes that can be used and frequencies to be used allow an easier signal separation.

DESCRIPTION OF EMBODIMENTS

Figure 1:
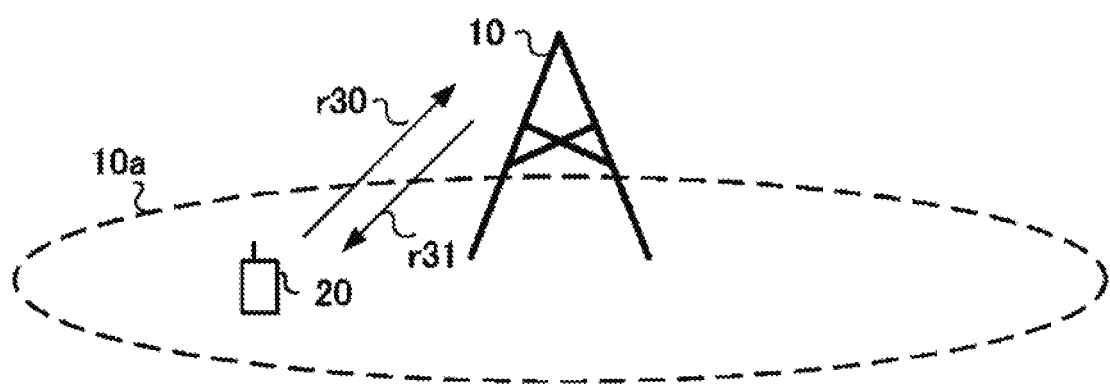
FIG. 1 is a diagram illustrating a configuration example of a communication system 1 according to a first embodiment.

A communication system according to the present embodiments includes a base station apparatus (a cell, a small cell, a serving cell, a component carrier, an eNodeB, a Home eNodeB, and a gNodeB) and a terminal apparatus (a terminal, a mobile terminal, and User Equipment (UE)). In the communication system, in a case of a downlink, the base station apparatus serves as a transmitting apparatus (a transmission point, a transmit antenna group, a transmit antenna port group, or a Tx/Rx Point (TRP)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme, such as a Cyclic Prefix-Orthogonal Frequency Division Multiplexing (CP-OFDM). The communication system may use, in the uplink, a transmission scheme, such as a Discrete Fourier Transform Spread-Orthogonal Frequency Division Multiplexing (DFTS-OFDM, also referred to as an SC-FDMA).

The base station apparatus and the terminal apparatus according to the present embodiments can communicate in a frequency band for which an approval of use (license) has been obtained from the government of a country or region where a radio operator provides services, that is, a so-called licensed band, and/or in a frequency band for which no approval (license) from the government of the country or region is required, that is, a so-called unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Although the description is given mainly in a case of grant-free communication in the present embodiments, the present embodiments may be applied to other scheduling types such as dynamic scheduling and Semi-Persistent Scheduling (SPS). In the present specification, the data may be control information. Although the description is given in a case of an uplink, the present embodiments may be applied to a downlink or a sidelink (inter-terminal communication).

First Embodiment

FIG. 1 is a diagram illustrating a configuration example of a communication system 1 according to the present embodiment. The communication system 1 according to the present embodiment includes a base station apparatus 10 and a terminal apparatus 20. Coverage 10a is a range (a communication area) in which the base station apparatus 10 can connect to the terminal apparatus 20 (coverage 10a is also referred to as a cell). Note that the base station apparatus 10 can accommodate multiple terminal apparatuses 20 in the coverage 10a. The communication system 1 is a system that allows the terminal apparatus 20 to perform switching between multiple transmission schemes and switching of whether to multiplex data and reference signals, and to communicate with the base station apparatus 10. The multiple transmission schemes (access schemes) at least include DFT-S-OFDM and CP-OFDM.

In FIG. 1, an uplink radio communication r30 at least includes the following uplink physical channels. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The uplink control information includes a positive acknowledgement (ACK)/Negative acknowledgement (NACK) in response to downlink data (a Downlink transport block, a Medium Access Control Protocol Data Unit (MAC PDU), a Downlink-Shared Channel (DL-SCH), and a Physical Downlink Shared Channel (PDSCH). The ACK/NACK is also referred to as a Hybrid Automatic Repeat request ACKnowledgement (HARQ-ACK), a HARQ feedback, a HARQ response, or a signal indicating HARQ control information or a delivery confirmation.

The uplink control information includes a Scheduling Request (SR) used to request a PUSCH (Uplink-Shared Channel (UL-SCH)) resource for initial transmission. The scheduling request indicates that the UL-SCH resource for initial transmission is requested.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel. The CQI can use an index (CQI index) indicative of a preferable modulation scheme (for example, QPSK, 16 QAM, 64 QAM, 256 QAMAM, or the like), a preferable coding rate, and a preferable frequency utilization efficiency in a predetermined band. The terminal apparatus selects, from the CQI table, a CQI index considered to allow a transport block on the PDSCH to be received within a predetermined block error probability (for example, an error rate of 0.1).

The PUSCH is a physical channel used to transmit uplink data (an Uplink Transport Block, an Uplink-Shared Channel (UL-SCH)), and CP-OFDM or DFT-S-OFDM is applied as a transmission scheme. The PUSCH may be used to transmit the HARQ-ACK in response to the downlink data and/or the channel state information along with the uplink data. The PUSCH may be used to transmit only the channel state information. The PUSCH may be used to transmit only the HARQ-ACK and the channel state information.

The PUSCH is used to transmit radio resource control (Radio Resource Control (RRC)) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment specific (user equipment unique) information is transmitted using the signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signal (higher layer signaling). The RRC signaling and/or the MAC CE are included in a transport block.

The PRACH is used to transmit a preamble used for random access. The PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

In the uplink radio communication, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS). The DMRS is associated with transmission of the physical uplink-shared channel/physical uplink control channel. For example, the base station apparatus 10 uses the demodulation reference signal to perform channel estimation/channel compensation in a case of demodulating the physical uplink-shared channel/the physical uplink control channel.

The SRS is not associated with the transmission of the physical uplink shared channel/the physical uplink control channel. The base station apparatus 10 uses the SRS to measure an uplink channel state (CSI Measurement).

In FIG. 1, at least the following downlink physical channels are used in radio communication of the downlink r31. The downlink physical channels are used for transmitting information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast CHannel (BCH)) that is used commonly by the terminal apparatuses. The MIB is one of pieces of system information. For example, the MIB includes a downlink transmission bandwidth configuration and a System Frame Number (SFN). The MIB may include information for indicating at least some of the number of the slot in which PBCH is transmitted, the number of the subframe in which PBCH is transmitted, and the number of the radio frame in which PBCH is transmitted.

The PDCCH is used to transmit downlink control information (DCI). For the downlink control information, multiple formats based on applications (also referred to as DCI formats) are defined. The DCI format may be defined based on the type and the number of bits of the DCI constituting a single DCI format. Each format is used depending on the application. The downlink control information includes control information for downlink data transmission and control information for uplink data transmission. The DCI format for the downlink data transmission is also referred to as a downlink assignment (or downlink grant) and includes parameters for uplink transmission. The DCI format for the uplink data transmission is also referred to as an uplink grant (or uplink assignment) and includes parameters for uplink transmission.

A single downlink assignment is used for scheduling a single PDSCH in a single serving cell. The downlink grant may be used for at least scheduling of the PDSCH within the same slot as the slot in which the downlink grant has been transmitted. The downlink assignment includes downlink control information, such as a resource block allocation for the PDSCH, a Modulation and Coding Scheme (MCS) for the PDSCH, a NEW Data Indicator (NDI) for indicating initial transmission or retransmission, information for indicating the HARQ process number in the downlink, and a Redundancy version for indicating an amount of redundancy added to the codeword during error correction coding. The codeword is data after the error correcting coding. The downlink assignment may include a Transmission Power Control (TPC) command for the PUCCH and a TPC command for the PUSCH. The uplink grant may include a Repetition number for indicating the number of repetitions for transmission of the PUSCH. Note that the DCI format for each downlink data transmission includes information (fields) required for the application among the above-described information.

A single uplink grant is used for notifying the terminal apparatus of scheduling of a single PUSCH in a single serving cell. The uplink grant includes uplink control information, such as information on the resource block allocation for transmission of the PUSCH (resource block allocation and hopping resource allocation), information on the MCS for the PUSCH (MCS/Redundancy version), the number of cyclic shifts performed on the DMRS, information on retransmission of the PUSCH, a TPC command for the PUSCH, and a request for downlink Channel State Information (CSI)(CSI request). The uplink grant may include information for indicating the HARQ process number in the uplink, a Transmission Power Control (TPC) command for the PUCCH, and a TPC command for the PUSCH. Note that the DCI format for each uplink data transmission includes information (fields) required for the application among the above-described information.

The PDCCH is generated by adding a Cyclic Redundancy Check (CRC) to the downlink control information. In the PDCCH, CRC parity bits are scrambled with a predetermined identifier (also referred to as an exclusive OR operation, mask). The parity bits are scrambled with a Cell-Radio Network Temporary Identifier (C-RNTI), a Semi Persistent Scheduling (SPS) C-RNTI, a Temporary C-RNTI, a Paging (P)-RNTI, a System Information (SI)-RNTI, or a Random Access (RA)-RNTI. The C-RNTI and the SPS C-RNTI are identifiers for identifying a terminal apparatus within a cell. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The SPS C-RNTI is used to periodically allocate a resource for the PDSCH or the PUSCH. The P-RNTI is used to transmit a paging message (Paging Channel (PCH)). The SI-RNTI is used to transmit the SIB, and the RA-RNTI is used to transmit a random access response (a message 2 in a random access procedure).

The PDSCH is used to transmit the downlink data (the downlink transport block, DL-SCH). The PDSCH is used to transmit a system information message (also referred to as a System Information Block (SIB)). Some or all of the SIBs can be included in the RRC message.

The PDSCH is used to transmit the RRC signaling. The RRC signaling transmitted from the base station apparatus may be common to the multiple terminal apparatuses in the cell (unique to the cell). That is, the information common to the user equipments in the cell is transmitted using the RRC signaling unique to the cell. The RRC signaling transmitted from the base station apparatus may be a message dedicated to a certain terminal apparatus (also referred to as dedicated signaling). In other words, user equipment specific (user equipment unique) information is transmitted by using the message dedicated to the certain terminal apparatus.

The PDSCH is used to transmit the MAC CE. The RRC signaling and/or the MAC CE is also referred to as a higher layer signal (higher layer signaling). The PMCH is used to transmit multicast data (Multicast Channel (MCH)).

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The downlink reference signal is used for the terminal apparatus to perform the channel estimation/channel compensation on the downlink physical channel. For example, the downlink reference signal is used to demodulate the PBCH, the PDSCH, and the PDCCH. The downlink reference signal can be used for the terminal apparatus to measure the downlink channel state (CSI measurement).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 2:
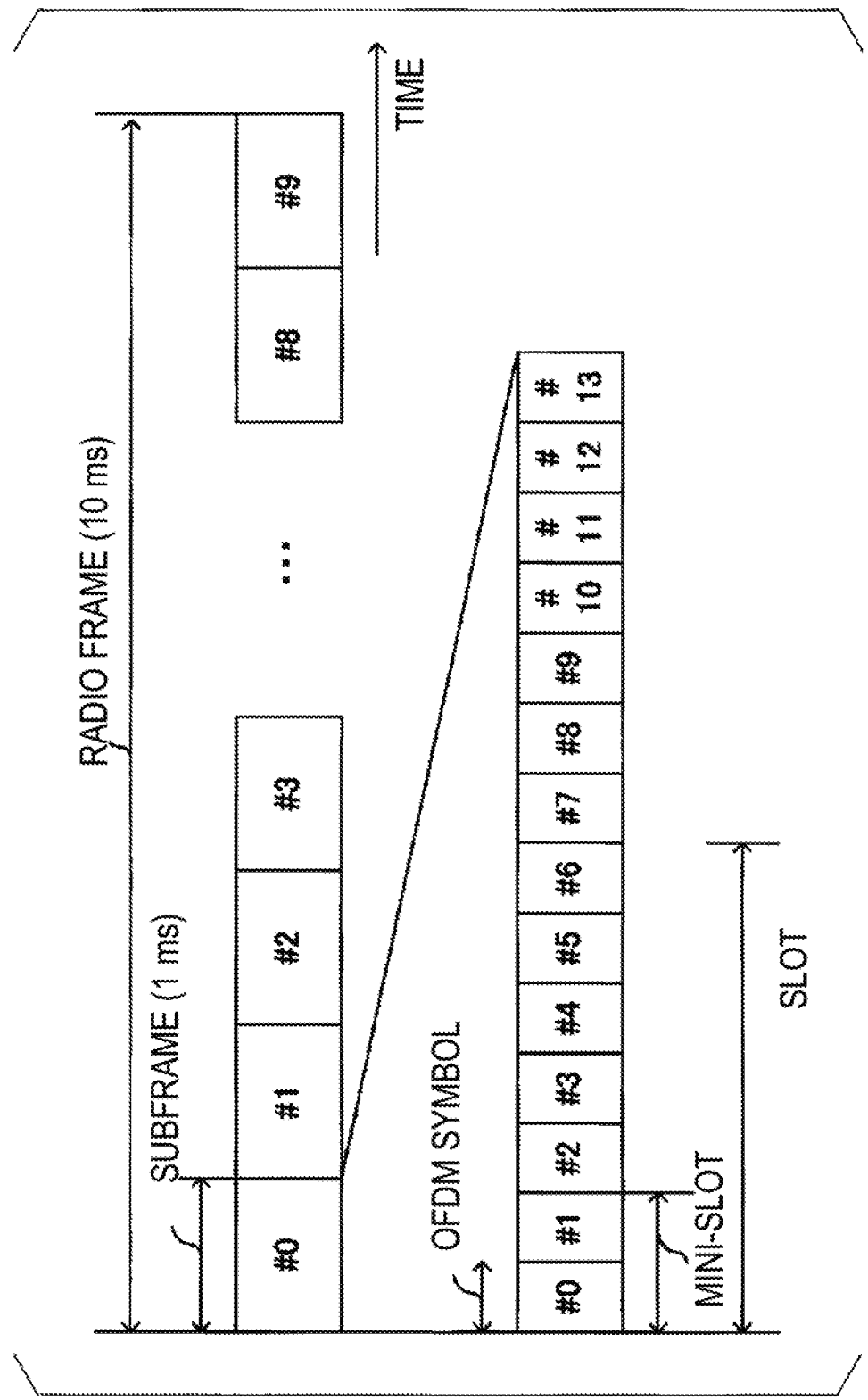
FIG. 2 is a diagram illustrating an example radio frame structure for the communication system 1 according to the first embodiment.

FIG. 2 is a diagram illustrating an example radio frame structure for the communication system 1 according to the present embodiment. One radio frame is defined as a fixed length of 10 ms. In a case that subcarrier spacing is 15 kHz, one subframe is defined as a fixed length of 1 ms. One radio frame includes 10 subframes. One slot is defined by the number of OFDM symbols. The number of slots included in one subframe changes depending on the number of OFDMs included in one slot. FIG. 2 is an example in which one slot includes seven OFDM symbols with the slot length of 0.5 ms. In this case, one subframe includes two slots. One mini-slot is defined by the number of OFDM symbols. The number of OFDM symbols included in the mini-slot is smaller than the number of OFDM symbols included in the slot. FIG. 2 is an example in which one mini-slot includes two OFDM symbols. The communication system 1 maps the physical channel to the radio resource on a per slot or per mini-slot basis. Note that, in communications using the DFT-s-OFDM, a DFT-s-OFDM (Single Carrier-Frequency Division Multiple Access (SC-FDMA)) symbol is used as the OFDM symbol.

Figure 3:
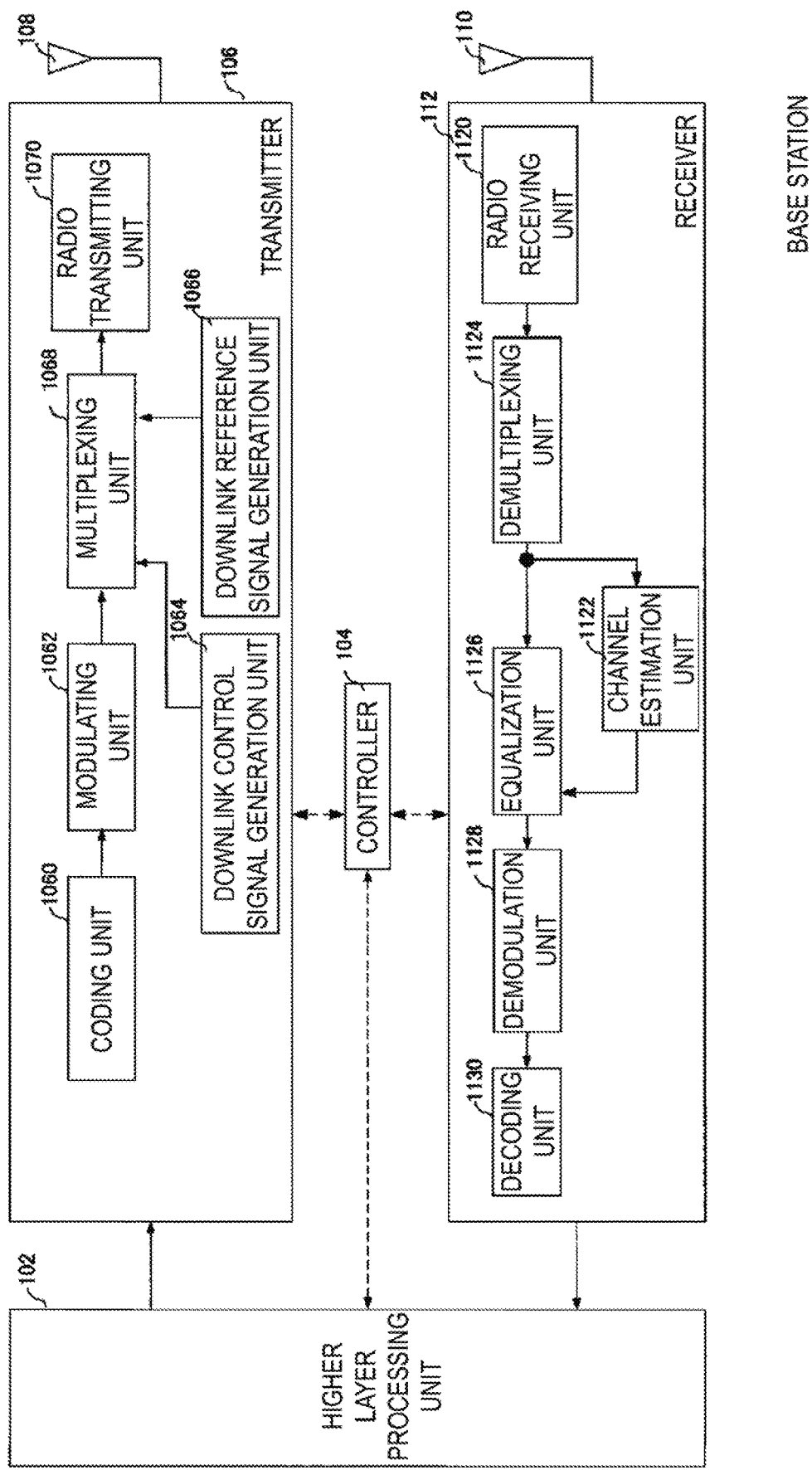
FIG. 3 is a schematic block diagram of a configuration of a base station apparatus 10 according to the first embodiment.

FIG. 3 is a schematic block diagram of a configuration of the base station apparatus 10 according to the present embodiment. The base station apparatus 10 includes a higher layer processing unit (higher layer processing step) 102, a controller (control step) 104, a transmitter (transmitting step) 106, a transmit antenna 108, a receive antenna 110, and a receiver (receiving step) 112. The transmitter 106 generates the physical downlink channel in accordance with a logical channel input from the higher layer processing unit 102. The transmitter 106 is configured to include a coding unit (coding step) 1060, a modulating unit (modulating step) 1062, a downlink control signal generation unit (downlink control signal generating step) 1064, a downlink reference signal generation unit (downlink reference signal generating step) 1066, a multiplexing unit (multiplexing step) 1068, and a radio transmitting unit (radio transmitting step) 1070. The receiver 112 detects (demodulates, decodes, or the like) the physical uplink channel and inputs the content to the higher layer processing unit 102. The receiver 112 is configured to include a radio receiving unit (radio receiving step) 1120, a channel estimation unit (channel estimating step) 1122, a demultiplexing unit (demultiplexing step) 1124, an equalization unit (equalizing step) 1126, a demodulation unit (demodulating step) 1128, and a decoding unit (decoding step) 1130.

The higher layer processing unit 102 performs processing on a layer, such as a Medium Access Control (MAC) layer, a Packet Data Convergence Protocol (PDCP) layer, a Radio Link Control (RLC) layer, and a Radio Resource Control (RRC) layer, that is higher than the physical layer. The higher layer processing unit 102 generates information required to control the transmitter 106 and the receiver 112, and outputs the resultant information to the controller 104. The higher layer processing unit 102 outputs the downlink data (such as DL-SCH), the system information (MIB, SIB), and the like to the transmitter 106.

The higher layer processing unit 102 generates, or acquires from a higher node, the system information (a part of the MIB or the SIB) to be broadcasted. The higher layer processing unit 102 outputs the system information to be broadcasted to the transmitter 106 as BCH/DL-SCH. The MIB is allocated to the PBCH in the transmitter 106. The SIB is allocated to the PDSCH in the transmitter 106. The higher layer processing unit 102 generates, or acquires from a higher node, the system information (SIB) specific to the terminal apparatus. The higher layer processing unit may include, in the SIB, information on application such as eMBB/URLLC/mMTC. The SIB is allocated to the PDSCH in the transmitter 106.

The higher layer processing unit 102 configures various RNTIs for each terminal apparatus. The RNTI is used for encryption (scrambling) of the PDCCH, the PDSCH, and the like. The higher layer processing unit 102 outputs the RNTI to the controller 104/the transmitter 106/the receiver 112.

The higher layer processing unit 102 generates, or acquires them from the higher node, the downlink data (transport block, DL-SCH) allocated to the PDSCH, the system information specific to the terminal apparatus (System Information Block: SIB), the RRC message, the MAC CE, and the like, and outputs them to the transmitter 106. The higher layer processing unit 102 manages various kinds of configuration information of the terminal apparatus 20. Note that a part of the function of the radio resource control may be performed in the MAC layer or the physical layer.

The higher layer processing unit 102 receives information on the terminal apparatus, such as the function supported by the terminal apparatus (UE capability), from the terminal apparatus 20 (via the receiver 112). The terminal apparatus 20 transmits its own function to the base station apparatus 10 by a higher layer signal (RRC signaling). The information on the terminal apparatus includes information for indicating whether the terminal apparatus supports a predetermined function or information for indicating that the terminal apparatus has completed introduction and testing of the predetermined function. The information for indicating whether the predetermined function is supported includes information for indicating whether the introduction and testing of the predetermined function have been completed.

In a case that the terminal apparatus supports the predetermined function, the terminal apparatus transmits information (parameters) for indicating whether the predetermined function is supported. In a case that the terminal apparatus does not support the predetermined function, the terminal apparatus may be configured not to transmit information (parameters) for indicating whether the predetermined function is supported. In other words, whether the predetermined function is supported is notified by whether information (parameters) for indicating whether the predetermined function is supported is transmitted. The information (parameters) for indicating whether the predetermined function is supported may be notified by using one bit of 1 or 0.

The higher layer processing unit 102 acquires the DL-SCH from the decoded uplink data (including the CRC) from the receiver 112. The higher layer processing unit 102 performs error detection on the uplink data transmitted by the terminal apparatus. For example, the error detection is performed in the MAC layer.

The controller 104 controls the transmitter 106 and the receiver 112 based on the various kinds of configuration information input from the higher layer processing unit 102/receiver 112. The controller 104 generates the downlink control information (DCI) based on the configuration information input from the higher layer processing unit 102/receiver 112, and outputs the generated downlink control information to the transmitter 106. In addition to the information on the DMRS, the DCI includes various kinds of information, such as information on the MCS and the frequency allocation.

The controller 104 determines the MCS of the PUSCH in consideration of channel quality information (CSI Measurement result) measured by the channel estimation unit 1122. The controller 104 determines an MCS index corresponding to the MCS of the PUSCH. The controller 104 includes, in the uplink grant, the MCS index determined.

The transmitter 106 generates the PBCH, the PDCCH, the PDSCH, the downlink reference signal, and the like in accordance with the signal input from the higher layer processing unit 102/controller 104. The coding unit 1060 performs encoding (including repetition) using block code, convolutional code, turbo code, polar coding, LDPC code, or the like on the BCH, the DL-SCH, and the like input from the higher layer processing unit 102 by using a predetermined coding scheme/a coding scheme determined by the higher layer processing unit 102. The coding unit 1060 performs puncturing on the coded bits based on the coding rate input from the controller 104. The modulating unit 1062 performs data modulation on the coded bits input from the coding unit 1060 by using a predetermined modulation scheme (modulation order)/a modulation scheme (modulation order) input from the controller 104, such as the BPSK, QPSK, 16 QAM, 64 QAM, or 256 QAM. The modulation order is based on the MCS index selected by the controller 104.

The downlink control signal generation unit 1064 adds the CRC to the DCI input from the controller 104. The downlink control signal generation unit 1064 encrypts (scrambles) the CRC by using the RNTI. Furthermore, the downlink control signal generation unit 1064 performs QPSK modulation on the DCI to which the CRC is added, and generates the PDCCH. The downlink reference signal generation unit 1066 generates a sequence known to the terminal apparatus as a downlink reference signal. The known sequence is determined by a predetermined rule based on a physical cell identity for identifying the base station apparatus 10 and the like.

The multiplexing unit 1068 multiplexes the PDCCHs/downlink reference signals/modulation symbols of the respective channels input from the modulating unit 1062. In other words, the multiplexing unit 1068 maps the PDCCHs/downlink reference signals/modulation symbols of the respective channels to the resource elements. The resource elements to which the mapping is performed are controlled by downlink scheduling input from the controller 104. The resource element is the minimum unit of a physical resource including one OFDM symbol and one subcarrier. Note that, in a case of performing MIMO transmission, the transmitter 106 includes the coding units 1060 and the modulating units 1062. Each of the number of the coding units 1060 and the number of the modulating units 1062 is equal to the number of layers. In this case, the higher layer processing unit 102 configures the MCS for each transport block in each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate a baseband digital signal. Furthermore, the radio transmitting unit 1070 converts the digital signal into an analog signal, removes unnecessary frequency components from the analog signal by filtering, performs up-conversion to a signal of a carrier frequency, performs power amplification, and outputs the resultant signal to the transmit antenna 108 for transmission.

In accordance with an indication from the controller 104, the receiver 112 detects (separates, demodulates, and decodes) the reception signal received from the terminal apparatus 20 through the receive antenna 110, and inputs the decoded data to the higher layer processing unit 102/controller 104. The radio receiving unit 1120 converts the uplink signal received through the receive antenna 110 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 1120 removes a part corresponding to the CP from the converted digital signal. The radio receiving unit 1120 performs Fast Fourier Transform (FFT) on the signal from which the CPs have been removed, and extracts a signal in the frequency domain. The signal in the frequency domain is output to the demultiplexing unit 1124.

The demultiplexing unit 1124 demultiplexes the signals input from the radio receiving unit 1120 into signals, such as the PUSCH, the PUCCH, and the uplink reference signal, based on uplink scheduling information (such as uplink data channel allocation information) input from the controller 104. The uplink reference signal resulting from the demultiplexing is input to the channel estimation unit 1122. The PUSCH and PUCCH resulting from the demultiplexing are output to the equalization unit 1126.

The channel estimation unit 1122 uses the uplink reference signal to estimate a frequency response (or a delay profile). The result of frequency response in the channel estimation for demodulation is input to the equalization unit 1126. The channel estimation unit 1122 measures the uplink channel condition (measures a Reference Signal Received Power (RSRP), a Reference Signal Received Quality (RSRQ), and a Received Signal Strength Indicator (RSSI)) by using the uplink reference signal. The measurement of the uplink channel state is used to determine the MCS for the PUSCH and the like.

The equalization unit 1126 performs processing to compensate for an influence in a channel based on the frequency response input from the channel estimation unit 1122. As a method for the compensation, any existing channel compensation, such as a method of multiplying an MMSE weight or an MRC weight and a method of applying an MLD, is applicable. The demodulation unit 1128 performs demodulation processing based on the information on a predetermined modulation scheme/modulation scheme indicated by the controller 104.

The decoding unit 1130 performs decoding processing on the output signal from the demodulation unit based on the information on a predetermined coding rate/coding rate indicated by the controller 104. The decoding unit 1130 inputs the decoded data (such as the UL-SCH) to the higher layer processing unit 102.

Figure 4:
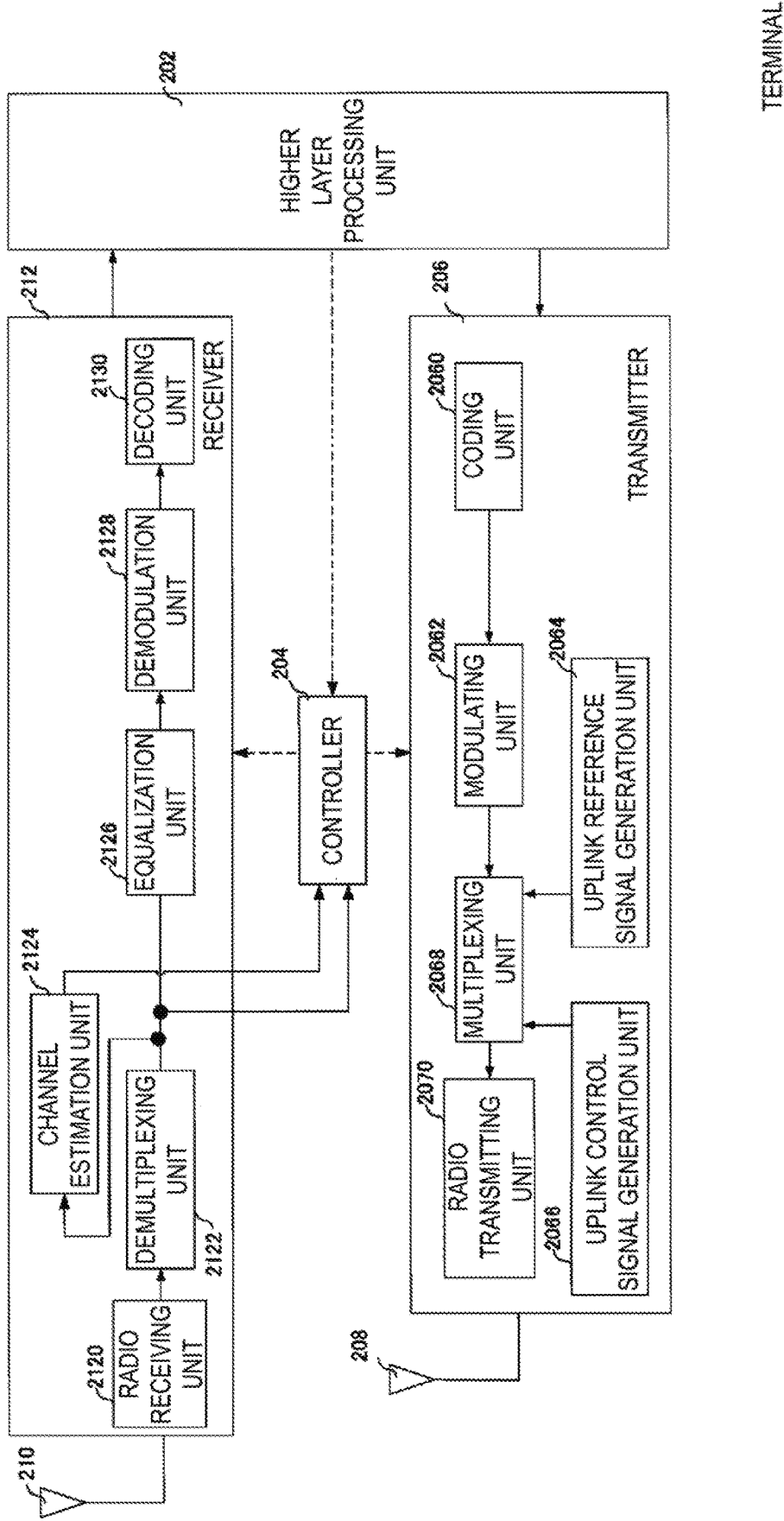
FIG. 4 is a schematic block diagram illustrating a configuration of a terminal apparatus 20 according to the first embodiment.

FIG. 4 is a schematic block diagram illustrating a configuration of the terminal apparatus 20 according to the present embodiment. The terminal apparatus 20 is configured to include a higher layer processing unit (higher layer processing step) 202, a controller (control step) 204, a transmitter (transmitting step) 206, a transmit antenna 208, a receive antenna 210, and a receiver (receiving step) 212.

The higher layer processing unit 202 performs processing of the medium access control (MAC) layer, the packet data convergence protocol (PDCP) layer, the radio link control (RLC) layer, and the radio resource control (RRC) layer. The higher layer processing unit 202 manages various kinds of configuration information of the terminal apparatus itself. The higher layer processing unit 202 notifies the base station apparatus 10 of information for indicating terminal apparatus functions supported by the terminal apparatus itself (UE Capability) via the transmitter 206. The higher layer processing unit 202 notifies the UE Capability by RRC signaling.

The higher layer processing unit 202 acquires the decoded data, such as the DL-SCH and the BCH, from the receiver 212. The higher layer processing unit 202 generates the HARQ-ACK from a result of the error detection of the DL-SCH. The higher layer processing unit 202 generates the SR. The higher layer processing unit 202 generates the UCI including the HARQ-ACK/SR/CSI (including the CQI report). The higher layer processing unit 202 inputs the UCI and the UL-SCH to the transmitter 206. Note that some functions of the higher layer processing unit 202 may be included in the controller 204.

The controller 204 interprets the downlink control information (DCI) received via the receiver 212. The controller 204 controls the transmitter 206 in accordance with PUSCH scheduling/MCS index/Transmission Power Control (TPC), and the like acquired from the DCI for uplink transmission. The controller 204 controls the receiver 212 in accordance with the PDSCH scheduling/the MCS index and the like acquired from the DCI for downlink transmission.

The transmitter 206 is configured to include a coding unit (coding step) 2060, a modulating unit (modulating step) 2062, an uplink reference signal generation unit (uplink reference signal generating step) 2064, an uplink control signal generation unit (uplink control signal generating step) 2066, a multiplexing unit (multiplexing step) 2068, and a radio transmitting unit (radio transmitting step) 2070.

In accordance with the control by the controller 204 (in accordance with the coding rate calculated based on the MCS index), the coding unit 2060 codes the uplink data (UL-SCH) input from the higher layer processing unit 202 by convolutional coding, block coding, turbo coding, or the like.

The modulating unit 2062 modulates the coded bits input from the coding unit 2060 (generates modulation symbols for the PUSCH) by a modulation scheme predetermined from the controller 204/modulation scheme predetermined for each channel, such as BPSK, QPSK, 16 QAM, 64 QAM, and 256 QAM. Furthermore, in a case that a transmission scheme based on DFT-S-OFDM is used, Discrete Fourier Transform (DFT) is applied to a modulation symbol sequence. Meanwhile, in a case that a transmission scheme based on CP-OFDM is used, the DFT is not applied to the modulation symbol sequence.

The uplink reference signal generation unit 2064 generates a sequence determined from a predetermined rule (formula), based on a physical cell identity (PCI), which is also referred to as a cell ID, or the like, for identifying the base station apparatus 10, a bandwidth in which the uplink reference signals are mapped, a cyclic shift, parameter values to generate the DMRS sequence, further the frequency allocation, and the like, in accordance with an indication by the controller 204.

In accordance with the indication from the controller 204, the uplink control signal generation unit 2066 encodes the UCI, performs the BPSK/QPSK modulation, and generates modulation symbols for the PUCCH.

In accordance with the uplink scheduling information from the controller 204 (transmission interval in the SPS for the uplink included in the RRC message, resource allocation included in the DCI, and the like), the multiplexing unit 2068 multiplexes the modulation symbols for the PUSCH, the modulation symbols for the PUCCH, and the uplink reference signals for each transmit antenna port (in other words, the respective signals are mapped to the resource elements).

The radio transmitting unit 2070 performs Inverse Fast Fourier Transform (IFFT) on the multiplexed signals to generate OFDM symbols. The radio transmitting unit 2070 adds CPs to the OFDM symbols to generate a baseband digital signal. Furthermore, the radio transmitting unit 2070 converts the baseband digital signal into an analog signal, removes unnecessary frequency components from the analog signal, converts the signal into a signal of a carrier frequency by up-conversion, performs power amplification, and transmits the resultant signal to the base station apparatus 10 via the transmit antenna 208.

The receiver 212 is configured to includes a radio receiving unit (radio receiving step) 2120, a demultiplexing unit (demultiplexing step) 2122, a channel estimation unit (channel estimating step) 2144, an equalization unit (equalizing step) 2126, a demodulation unit (demodulating step) 2128, and a decoding unit (decoding step) 2130.

The radio receiving unit 2120 converts the downlink signal received through the receive antenna 210 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 2120 removes a part corresponding to the CP from the digital signal resulting from the conversion, performs the FFT on the signal from which the CP has been removed, and extracts a signal in the frequency domain.

The demultiplexing unit 2122 separates the extracted signal in the frequency domain into the downlink reference signal, the PDCCH, the PDSCH, and the PBCH. A channel estimation unit 2124 uses the downlink reference signal (such as the DM-RS) to estimate a frequency response (or delay profile). The result of frequency response in the channel estimation for demodulation is input to the equalization unit 1126. The channel estimation unit 2124 measures the uplink channel state (measures a Reference Signal Received Power (RSRP), a Reference Signal Received Quality (RSRQ), a Received Signal Strength Indicator (RSSI), and a Signal to Interference plus Noise power Ratio (SINR)) by using the downlink reference signal (such as the CSI-RS). The measurement of the downlink channel state is used to determine the MCS for the PUSCH and the like. The measurement result of the downlink channel state is used to determine the CQI index and the like.

The equalization unit 2126 generates an equalization weight based on an MMSE criterion, from the frequency response input from the channel estimation unit 2124. The equalization unit 2126 multiplies the input signal (the PUCCH, the PDSCH, the PBCH, and the like) from the demultiplexing unit 2122 by the equalization weight. The demodulation unit 2128 performs demodulation processing based on information of the predetermined modulation order/the modulation order indicated by the controller 204.

The decoding unit 2130 performs decoding processing on the output signal from the demodulation unit 2128 based on information of the predetermined coding rate/the coding rate indicated by the controller 204. The decoding unit 2130 inputs the decoded data (such as the DL-SCH) to the higher layer processing unit 202.

The following describes a case of using the NOMA transmission. The NOMA may have a variety of meanings, and one of them refers to a grant-free communication scheme. Here, grant-free refers to a system that, instead of notifying one-time grant by using DCI signaling, allows radio resources defined by a time and frequency to be allocated periodically by using RRC signaling or DCI signaling, and allows the terminal apparatus to perform data transmission or perform no data transmission depending on presence or absence of the data, or the like. In the grant-free access scheme, the terminal apparatus transmits data at a timing when the terminal apparatus desires to perform the transmission in a predetermined communication slot shared by multiple terminal apparatuses. Accordingly, the base station apparatus that receives the data is required to perform data demodulation and processing to identify the terminal apparatus. Examples of the applications include a communication that requires a short delay or a system that allows a large number of terminal apparatuses to communicate with each other like machine-to-machine communications. Note that the communication slot may be shared by the multiple terminal apparatuses or may be allocated only for a specific terminal apparatus.

As another example of the NOMA, the NOMA may be used as a method for simultaneously communicating with a larger number of terminal apparatuses than those in a known Multi-User Multiple Input Multiple Input (MU-MIMO) transmission. Examples of the applications include a method for transmitting comparatively small data by sharing a part of communication resources where large capacity transmission is performed. These methods perform the transmission based on the DCI signaling notified from the base station apparatus. This eliminates the need for identifying the terminal apparatus, thus allowing the reception processing to be comparatively simple compared with that in the grant-free NOMA.

As described first in the embodiment, multiple transmission schemes may be used in the recent communication systems. In the above-described NOMA transmission, in a case that data of different transmission schemes are transmitted in the shared slot, the demodulation method is complex. Accordingly, one aspect of the present invention is to use a common transmission scheme in a slot for the NOMA transmission under an environment where the terminal apparatuses can transmit data by using multiple transmission schemes.

Further the common transmission scheme enables a NOMA scheme that has different properties. Here, examples of the different properties include a subcarrier (resource element) allocation used for transmission. For example, a slot allows non-continuous allocation of subcarriers, and another slot allows only continuous allocation of subcarriers. The CP-OFDM is used for a slot that allows the non-continuous allocation, and the DFT-S-OFDM is used for a slot that allows only the continuous allocation. With such a configuration, the number of terminal apparatuses that can be simultaneously connected can further be increased in the slot that allows the non-continuous allocation, and terminal apparatuses for which increase of transmit power is not desirable can perform communications in the slot that allows only the continuous allocation.

Also, a different property is that an allowable maximum transmit power is configured to a different value. For example, in a case of slots that have two properties of the CP-OFDM and the DFT-S-OFDM in the previous example, the maximum transmit power in the slot of the CP-OFDM is caused to be lower than the maximum transmit power of the DFT-S-OFDM.

To implement the NOMA scheme that have the common transmission scheme, the base station apparatus needs to explicitly or implicitly notify the terminal apparatus of the transmission scheme in a common slot that uses the NOMA scheme. Details of a method for implicit notification will be described in a second embodiment and a third embodiment. In a case that two transmission schemes are available, the terminal apparatus notifies, to the base station apparatus, that communications are performed by using either of or both transmission schemes. In the case of grant-free access, the terminal apparatus performs communications with the base station apparatus in the common slot that uses the transmission scheme notified to the base station apparatus.

In a case that grant-free NOMA communication is being performed, the base station apparatus may perform an uplink grant. In a case that the NOMA communication is to be performed by using the DFT-S-OFDM, either grant-free communication or granted communication may be selected because simultaneous transmission of grant-free transmission data and granted transmission data degrades the PAPR property. In this case, to cause the operation of the whole system to be stable, the granted communication is preferably prioritized. Meanwhile, in a case that the terminal apparatus is to perform the grant-free communication with low latency, the grant-free communication is preferably performed.

Whether the grant-free communication is communication with short delay can be determined from an allocation interval of the common slots. In a case that the common slots are allocated at a short interval, for example, at a slot interval equal to or shorter than a predetermined slot interval, the grant-free communication can be defined as the communication with short delay.

Meanwhile, in the case of the NOMA communication using the CP-OFDM, even in the case that the grant-free data transmission and the granted data transmission are performed simultaneously, the PAPR is not significantly degraded. In this case, the data transmissions can simultaneously be performed in a range of allowable total transmit power.

Note that, even in the NOMA communication using the DFT-S-OFDM, in a case that a capability to the base station apparatus has been notified to the base station apparatus, in a case that the use of the CP-OFDM has been notified from the base station apparatus by using RRC signaling, DCI signaling, or the like, or in a case that the terminal apparatus has notified to the base station apparatus that the CP-OFDM can be used, the grant-free data transmission and the granted data transmission can be performed simultaneously.

Although the present embodiment is applied to the PUSCH, namely, data channel, the present embodiment may be applied to not only the data channel but also the PUCCH, namely, control channel.

Second Embodiment

Figure 5:
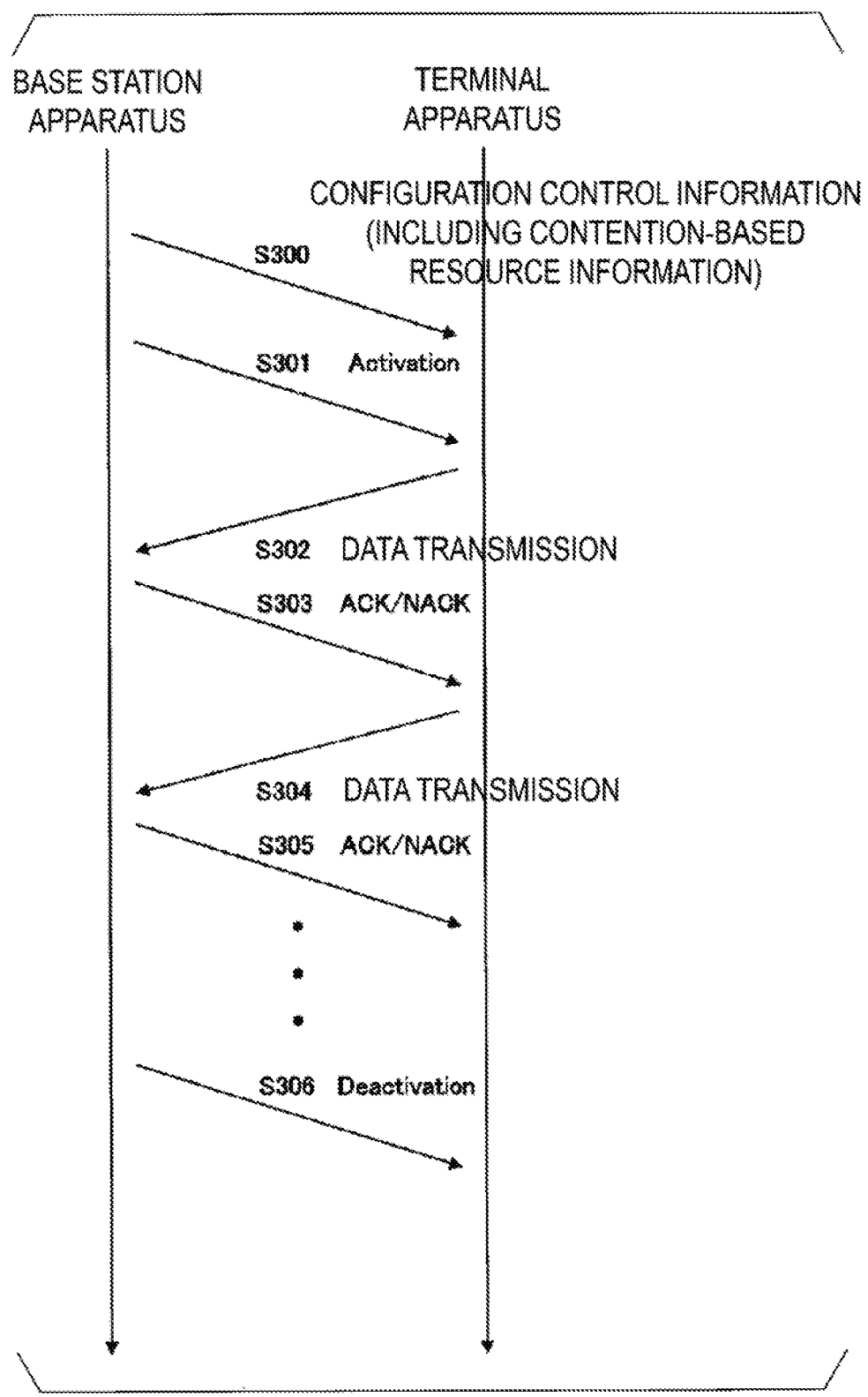
FIG. 5 is an example sequence chart for data transmission by the terminal apparatus according to the first embodiment.

FIG. 5 illustrates an example sequence chart for data transmission by the terminal apparatus according to the radio communication technology of the present embodiment. First, the base station apparatus transmits control information of a configuration regarding the NOMA (contention-based transmission, grant free) at a timing when the terminal apparatus is connected (S300). The control information of the configuration may be notified by RRC signaling or may be notified by using control information from the higher layer, such as the SIB, or the DCI format. The physical channel to be used may be a PDCCH, an EPDCCH, or a PDSCH, or another physical channel may be used. The control information of the configuration includes at least some of transmission parameters, such as the radio resource identified by time and/or frequency method that can be used in the NOMA, the MCS, the number of repetitions, an allocation cycle, a slot number that allows transmission, and information of cyclic shift of reference signal. In a case that the terminal apparatus can also use a non-contention-based radio communication technology, such as LTE, LTE-Advanced, and LTE-Advanced Pro, the control information may also be included. The transmission of an activation signal from the base station apparatus to the terminal apparatus (S301) allows the terminal apparatus to use a contention-based uplink and transmit data (S302). Here, the activation signal may be L1 signaling that includes the DCI and the like. In this case, the base station apparatus may be notified that the receiver in the terminal apparatus has correctly decoded the L1 signaling and has performed activation via the control signal from the higher layer, such as the RRC or the MAC CE. Without using the activation signal, the activation may be considered to have been performed at a time point when the transmitter in the terminal apparatus has transmitted to the base station apparatus a confirmation that a configuration has been performed after the receiver in the terminal apparatus has received the configuration regarding the NOMA and the controller in the terminal apparatus has performed the configuration. The base station apparatus receives the data signal transmitted by the terminal apparatus, and the receiver demodulates and decodes the data. The receiver performs data determination using the CRC and transmits ACK/NACK for indicating whether the data has an error (S303). The terminal apparatus can continuously transmit data (S304) without transmitting the control signal. The terminal apparatus can stop, or may not necessarily stop, the use of the contention-based uplink by receiving a deactivation signal (S306). The terminal apparatus may stop the use of the contention-based uplink in a case that the above-described configuration regarding the NOMA is released.

With the configuration information regarding the NOMA or the configuration information regarding the NOMA and the activation signal, a frequency allocation and a time (slot) allocation, namely, a radio resource that allows transmission of data signals is notified to the terminal apparatus. Because of the contention-based access, the base station apparatus can allow the multiple terminal apparatuses to use the same radio resource.

Description will be given of a case that transmission is performed by the NOMA and a DFT-S-OFDM based transmission is performed. Since the waveform has a low Peak to Average Power Ratio (PAPR) in the DFT-S-OFDM, it is desirable to maintain the low PAPR also in the case that the transmission is performed by the NOMA. Thus, a NOMA index is used as information for spreading the modulation symbols in the transmitter. The use of the NOMA index is not limited to this, and the NOMA index may be used as information for spreading signal blocks resulting from the IFFT on a per-block basis. In this case, since no other change is made, the continuous subcarriers are used as signal spectra.

Next, a description will be given of a case that transmission is performed by the NOMA and a CP-OFDM based transmission is performed. Because the waveform has a high PAPR in the CP-OFDM, there is little necessity to consider the PAPR of the signal waveform. Thus, the NOMA index is used for non-continuous spectrum allocation in the transmitter. A spreading code including zero is used for information for spreading the modulation symbols in the frequency domain and/or the time domain. Note that the non-continuous spectrum allocation refers to a spectrum allocation other than the spectrum allocation to all the frequency resources allocated and may have any configuration, regardless of the number of spectra, subcarrier spacing for the non-continuity, and regularity.

According to one or more aspects of the present invention, during uplink data transmission in the NOMA region, the spectra usage is changed based on a base waveform. This allows the transmission signal to maintain a desired PAPR. The base station apparatus controls the controller in the terminal apparatus by the higher layer and the L1 signaling, such that the signals spatially multiplexed in the NOMA region have the same spectra usage. As a result, the method for continuously allocating the spectra and the method for non-continuously allocating the spectra do not share the same radio resource, thus allowing an easier signal detection by the receiver in the base station apparatus and improving a transmission performance.

Third Embodiment

In the second embodiment, the example has been described that determines the generation method of the signal waveform (that is, whether to use the continuous subcarriers or to use the discontinuous subcarriers) in the case that the base waveform is configured and the transmission is performed in the NOMA region according to the base waveform. In the present embodiment, a description will be given of a case that the generation method of the signal waveform is designated by higher layer signaling (MAC CE or RRC) on a per-scheduling basis, instead of determining the generation method according to the base waveform.

LTE employs dynamic scheduling and SPS. In NR, the number of scheduling types, such as grant-free scheduling and NOMA scheduling, that may be configured is larger than that of LTE. Furthermore, multiple scheduling types may be configured to the same terminal apparatus. In the present embodiment, a control regarding the signal waveform is notified by the higher layer signaling such as the RRC on a per-scheduling basis to determine the signal waveform by the controller in the terminal apparatus.

A scheduling type of the same type as scheduling type may have multiple configurations. For example, as a configuration of a first SPS, a configuration regarding the signal waveform is performed by the RRC, and as a configuration of a second SPS, a configuration regarding the signal waveform is performed by the RRC independently of the first SPS. One aspect of the present invention relates to a case that a different radio resource (region) is designated on a per-scheduling basis.

The configuration information of NOMA or the activation signal may include information of a NOMA signature. Here, the information of the NOMA signature is index information (hereinafter, a NOMA index) regarding the spreading code and the transmit power in a case that transmission is performed. Note that the information regarding the waveform may be included in the configuration information of NOMA or the activation signal, or may be separately notified from the higher layer. Alternatively, it may be implicitly determined according to the presence or absence of the UL grant, a reference signal configuration, the number of streams (the number of ranks, the number of layers), radio resources to be used, the number of slots, the serving cell, and the transmit power. Alternatively, it may be configured according to the scheduling type. For example, CP-OFDM is used in the dynamic scheduling and DFT-S-OFDM is used in the SPS.

Next, a description will be given of a configuration regarding the signal waveform. For example, in a case that "110001000010" is configured by the RRC signaling regarding the signal waveform, the controller in the terminal apparatus performs transmission using the first, second, sixth, and eleventh subcarriers among the 12 subcarriers constituting one resource block. That is, the transmission waveform using the non-continuous subcarriers is generated. Meanwhile, in a case that "111111111111" is configured by the RRC signaling, transmission using all the 12 subcarriers constituting one resource block is performed. In other words, the transmission waveform using the continuous subcarriers is generated. At this time, since the continuous subcarriers are used, the PAPR property may be degraded by applying the DFT to the modulation symbol sequence. Also, in a case that the number of resource blocks allocated through the DCI signaling from the base station apparatus is one and the RRC signaling regarding the signal waveform like "001111110000" is configured, the DFT may be applied. In addition, the DFT may be applied to not only a case of being continuous, but also a case that is are allocated at regular intervals like "100100100100" in the RRC signaling regarding the signal waveform. The 12 subcarriers are used and represented by 12 bits in the example described above. In a case that the non-continuous spectra are formed, the spectra to be used may be determined by combining the configuration in the RRC and other parameters. The other parameters include, for example, at least one of a cell ID, a codeword bit sequence, an OFDM symbol index, a slot (frame, subframe) number, and information on DMRS.

In a case that the use of the continuous spectra is notified, information on the spreading of the transmission signals may be further configured by the RRC for each scheduling type. For example, in a case that "1100" is notified, one OFDM symbol is multiplied by a spreading sequence "1, 1, −1, −1" to generate four OFDM symbols. Here, the spreading sequence may be determined by combining the notified information and at least one of other parameters. The other parameters include, for example, a cell ID, an OFDM symbol index, a slot (frame, subframe) number, and information on DMRS.

The above description has been given of the case that the information on the signal waveform and the information on the spreading are notified by the higher layer on a per-scheduling basis. One aspect of the present invention is not limited to this, and the terminal apparatus may be notified by using the L1 signaling such as the DCI.

Thus, according to the present embodiment, one or multiple scheduling assignments are configured, and the higher layer configures the information on the transmission waveform for each of the one or multiple scheduling assignments. The terminal apparatus generates the signal waveform based on the information on the transmission waveform. Accordingly, in a case that multiple terminal apparatuses share the radio resources used in the one or multiple scheduling assignments, the base station apparatus can perform control so as to multiplex only signals generated by the same type of signal generation method.

Note that some or all of the above-described embodiments can be combined for implementation.

Note that the apparatuses in the above-described embodiments may be partially enabled by a computer. In that case, a program for realizing the functions of the embodiments may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be suitably used in a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

10 Base station apparatus
20 Terminal apparatus
10a Range within which base station apparatus 10 is connectable to terminal apparatus
102 Higher layer processing unit
104 Controller
106 Transmitter
108 Transmit antenna
110 Receive antenna
112 Receiver
1060 Coding unit
1062 Modulating unit
1064 Downlink control signal generation unit
1066 Downlink reference signal generation unit
1068 Multiplexing unit
1070 Radio transmitting unit
1120 Radio receiving unit
1122 Channel estimation unit
1124 Demultiplexing unit
1126 Equalization unit
1128 Demodulation unit
1130 Decoding unit
202 Higher layer processing unit
204 Controller
206 Transmitter
208 Transmit antenna
210 Receive antenna
212 Receiver
2060 Coding unit
2062 Modulating unit
2064 Uplink reference signal generation unit
2066 Uplink control signal generation unit
2068 Multiplexing unit
2070 Radio transmitting unit
2120 Radio receiving unit
2122 Demultiplexing unit
2124 Channel estimation unit
2126 Equalization unit
2128 Demodulation unit
2130 Decoding unit

The invention claimed is:

1. A communication apparatus for communicating with a terminal apparatus using a plurality of multiple access schemes, the communication apparatus comprising:
   a controller configured to generate a control signal to be sent to the terminal apparatus; and
   a receiver configured to receive a signal from the terminal apparatus, wherein:
   the control signal is used to identify a communication slot that allows grant-free communication with the terminal apparatus,
   the control signal includes at least one of an allocated time interval and a multiple access scheme in the plurality of multiple access schemes used to perform communications between the terminal apparatuses and the communication apparatus,
   in a case that the multiple access scheme is Discrete Fourier Transform Spread Orthogonal Frequency-Division Multiplexing (DFT-S-OFDM), either a grant-free communication or a granted communication is selected for an uplink (UL) data transmission, and
   in a case that the multiple access scheme is Cyclic-Prefix Orthogonal Frequency-Division Multiplexing (CP-OFDM), both a grant-free communication and a granted communication are performed at a same time in a range of an allowable total transmit power.

2. The communication apparatus of claim 1, wherein:
   in a case that the allocated time interval is equal to or shorter than a predetermined time interval, the grant-free communication is performed for the UL data transmission, and
   in a case that the allocated time interval is longer than the predetermined time interval, the granted communication is performed for the UL data transmission.

3. The communication apparatus of claim 1, wherein:
   in a case that the multiple access scheme is CP-OFDM, a non-continuous spectrum allocation is performed, and
   a spreading code including zero is used for spreading modulation symbols in at least one of a frequency domain and a time domain.

4. The communication apparatus of claim 3, wherein a bitmap is configured by radio resource control (RRC) signaling to indicate a rule for performing the non-continuous spectrum allocation.

* * * * *